UNITED STATES PATENT OFFICE.

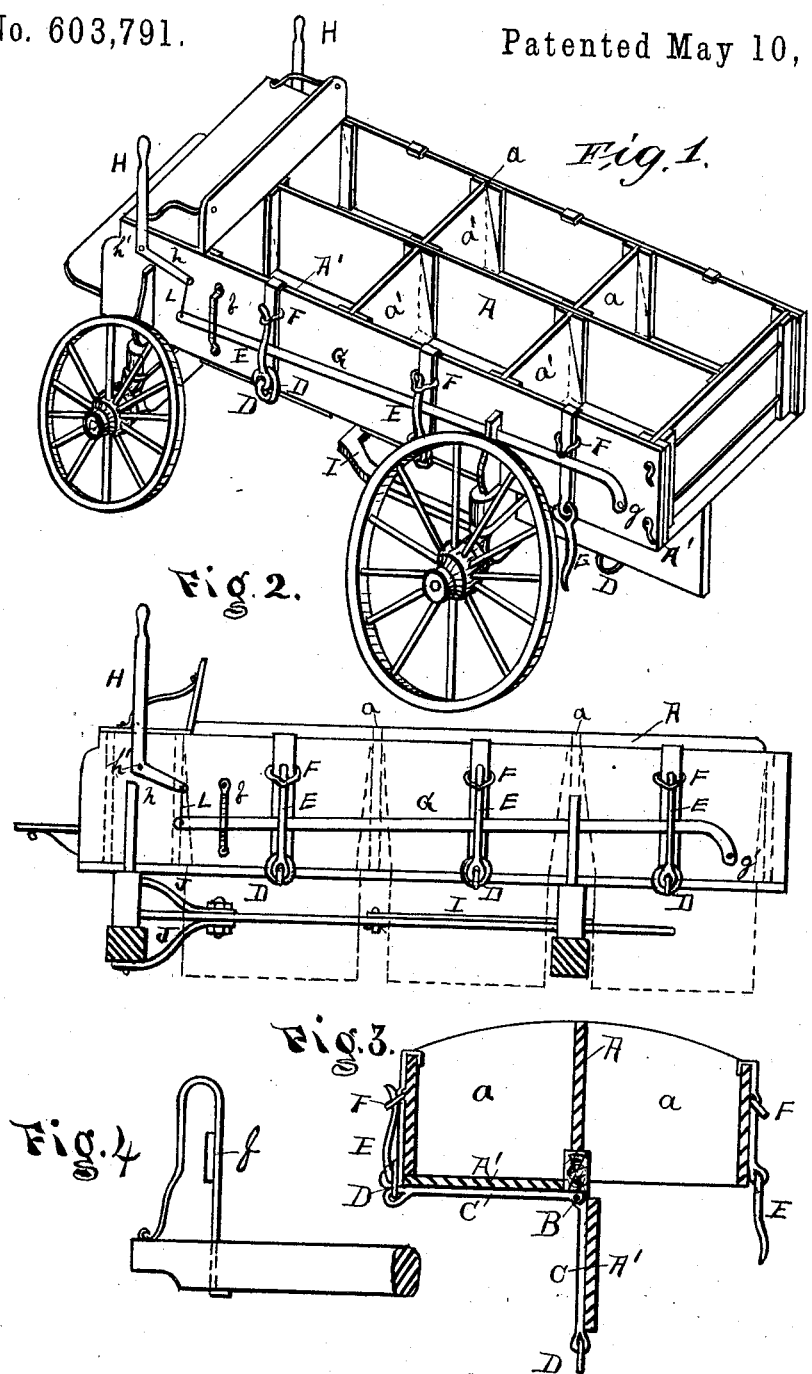

EDWARD PAUL LANGFORD, OF HARWICH, CANADA.

DUMPING-WAGON.

SPECIFICATION forming part of Letters Patent No. 603,791, dated May 10, 1898.

Application filed September 23, 1897. Serial No. 652,771. (No model.) Patented in Canada July 16, 1897, No. 56,682.

*To all whom it may concern:*

Be it known that I, EDWARD PAUL LANGFORD, yeoman, a subject of the Queen of Great Britain, residing in the township of Harwich, in the county of Kent and Province of Ontario, Canada, have invented certain new and useful Improvements in Wagons and Boxes, (for which I have obtained a patent in the Dominion of Canada, No. 56,682, bearing date July 16, 1897,) of which the following is a specification.

My invention relates to a new and useful improvement in wagon-boxes for hauling gravel, manure, or other substance; and the objects of my improvement are that the driver seated on his box can by the use of the handles unload one or more compartments instantly, thus saving time in unloading which would otherwise be required. I attain these objects by the mechanism illustrated in the accompanying drawings, in which—

Figure 1 is a side and top elevation of the wagon with the box embodying my invention. Fig. 2 is a side view showing the side of the box and the bottom. Fig. 3 is a section of the box, showing one door open and one door closed. Fig. 4 is one end of the bolster with a slot for working the lever in.

My invention is to make a wagon-box in six compartments (more or less) with six doors (more or less) at the bottom, through which gravel, manure, or other substance can be allowed to pass and be unloaded instantly or one compartment at a time, as may be desired.

The outside box is fourteen feet (more or less) long and the width of an ordinary wagon-box and is divided by the partition A, running from front to rear of said box, and then the box thus divided is again subdivided by partitions *a*, running crosswise, dividing the box into compartments. The number can be increased or decreased, as desired. At the bottom of the box is a long rod running from front to rear under the box, which said rod is fastened to a scantling or sill two and one-half inches by six inches or of any size required to support the said rod, which rod is fastened to a door for each compartment, which doors A' when closed form the bottom or floor of the box. These doors are fastened by two eyes or more, as desired. To each of these eyes are flat pieces of steel, riveted to the door, so as to be made a part thereof and so as to allow the door when open to fall down and hang on the rod at one side, thus allowing any material in the compartment to at once escape. The rod is marked B in the drawings. Then a strap of steel C is fastened along the center at the bottom of the door with a link D. When closed, the short lever E, twelve inches long, passes through this link D and is held upright against the side of the box by another link F, as shown in Figs. 1, 2, and 3, having a small bulge or curve at the upper side, as shown in said Fig. 3, the rod extending up. As shown in Fig. 1, two of the rods are up, and the end in a link at the top, and one door is down in Fig. 1, showing the position when the bottom door A' is open. Then a long flat lever G passes along the side of the box from near the rear end, where it is pivoted by the bolt *g*, to near the front end, as shown in Figs. 1 and 2. This long flat lever is kept close to the box by a bracket *b*, fastened into the box, near the front end thereof, so as to let it pass freely up and down. The lever is marked G on the plan in Fig. 1 and also passes through the side of the hind bolster in a slot *f*, as shown in Fig. 4. Then there is an oscillating link L, connecting forward end of lever G with the arm *h*, as shown in Figs. 1 and 2. Lever H is pivoted at the angle by the bolt *h'*. Then the hind hound I of the wagon is made, as shown in Fig. 1, so wide that the doors can fall down without being obstructed by same. The reach of the wagon is a flat piece of scantling or wood, against which the doors when open fall, and extends the full length of the wagon-box from front to rear. The front end of the reach has no hounds; but the reach is supported by the straps J J. To the subdivisions A are secured beveled pieces *a'* for the purpose of making a close joint for preventing sand, gravel, or loose material escaping. The said beveled pieces are removed when hauling manure or other substance not requiring a close box. The levers or handles H pass up alongside the driver on the wagon-box and are used to open a section at a time, or, if desired, all can be opened at one time, both sides of the box, levers, and everything else being exactly alike.

What I claim as my invention, and desire to secure by Letters Patent, is—

The combination with a wagon-box subdivided, each compartment having a hinged door or bottom A', the strap C, the link D, the bar E, and the link F, the long lever G pivoted by the bolt $g$, the oscillating link L engaging with the forward end of the lever G, and the lower end of the arm $h$ of the lever H its pivoted connection at $h'$, the bracket $b$, the slot $f$, substantially as specified and hereinbefore set forth.

EDWARD PAUL LANGFORD.

In presence of—
W. W. SCANE,
R. RICHARDSON.